United States Patent
Krishnamoorthy et al.

(10) Patent No.: US 9,857,791 B2
(45) Date of Patent: Jan. 2, 2018

(54) UNMANNED AERIAL VEHICLE CHARGING STATION MANAGEMENT

(71) Applicant: QUALCOMM Incorporated, San Diego, CA (US)

(72) Inventors: Parthasarathy Krishnamoorthy, San Diego, CA (US); Prashanth Mohan, Chennai (IN); KrishnaKumar Vasanthasenan, Hyderabad (IN); Suman Kumar Sinha, Bangalore (IN); Prasad Gadde, Hyderabad (IN); Ramu Thondapu, Hyderabad (IN); Sri Sai Kandakatla, Hyderabad (IN); Prachi Agrawal, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 7 days.

(21) Appl. No.: 15/166,989

(22) Filed: May 27, 2016

(65) Prior Publication Data
US 2017/0344000 A1 Nov. 30, 2017

(51) Int. Cl.
*B64C 39/00* (2006.01)
*G05D 1/00* (2006.01)
*B64C 39/02* (2006.01)
*B64F 1/36* (2017.01)

(52) U.S. Cl.
CPC ............ *G05D 1/0011* (2013.01); *B64C 39/00* (2013.01); *B64C 39/024* (2013.01); *B64F 1/362* (2013.01); *G05D 1/00* (2013.01); *G05D 1/0088* (2013.01); *B64C 2201/027* (2013.01); *B64C 2201/042* (2013.01); *B64C 2201/066* (2013.01); *B64C 2201/108* (2013.01); *B64C 2201/141* (2013.01); *B64C 2201/146* (2013.01)

(58) Field of Classification Search
CPC .................................. B64C 39/00; G05D 1/00
See application file for complete search history.

(56) References Cited

U.S. PATENT DOCUMENTS

| 8,890,480 B2 | 11/2014 | Vian et al. |
| 9,056,556 B1 | 6/2015 | Hyde et al. |
| 9,056,676 B1 | 6/2015 | Wang |
| 9,075,415 B2 | 7/2015 | Kugelmass |
| 9,139,310 B1 | 9/2015 | Wang |

*Primary Examiner* — Yonel Beaulieu
(74) *Attorney, Agent, or Firm* — The Marbury Law Group, PLLC

(57) ABSTRACT

Methods, devices, and systems of various embodiments are disclosed for managing an unmanned aerial vehicle (UAV) charging station having a docking terminal. In various embodiments, a priority of a first UAV and a second UAV may be determined for using the docking terminal when a docking request is received from the second UAV while the first UAV occupies the docking terminal. In some embodiments, the priorities of the first and second UAVs may be based on an available power level of each of the first and second UAVs. The first UAV may be instructed to undock from the docking terminal in response to determining that the second UAV has a higher priority.

22 Claims, 5 Drawing Sheets

UNMANNED AERIAL VEHICLE CHARGING STATION MANAGEMENT

BACKGROUND

The range of an unmanned aerial vehicle (UAV) may be extended by recharging onboard power cells (i.e., batteries) at one or more charging stations in route to a destination. However, as the number of commercial and recreational UAVs increases, the demand for time on charging stations may increase. Thus, a UAV needing to use a charging station may have to wait when all charging stations are occupied by other UAVs. Similarly, multiple UAVs may not be able to land at the same charging station at the same time. Efficient charging station resource management may enable UAVs that need recharging the most to receive a needed recharge for completing a mission without having to cut the mission short or returning to a base location. Such charging stations may be configured to autonomously make determination regarding a charging order for UAVs needing to dock at the charging station.

SUMMARY

Various embodiments include a charging station having a processor, and methods for operating the charging station when receiving docking requests from two or more UAVs. Various embodiments may include determining a priority of a first UAV and a second UAV for using a docking terminal of the charging station based on an available power level of each of the first and second UAVs. The first UAV may be instructed to undock from the docking terminal in response to determining that the second UAV has a higher priority.

Some embodiments may include establishing a communication link between the UAV charging station and the second UAV, and receiving the available power level and a UAV ranking from the second UAV. In such embodiments, determining the priority of the first and second UAVs for using the docking terminal may include determining the priority of the first and second UAVs for using the docking terminal by weighing the available power level and the UAV ranking of each of the first and second UAVs. In some embodiments, the available power level may be weighted more heavily than the UAV ranking when determining the priorities of the first and second UAVs for using the docking terminal in response to the available power level of either the first or second UAVs being below a predetermined low threshold. In some embodiments, the UAV ranking may be given no weighting when determining the priorities of the first and second UAVs for using the docking terminal in response to the available power level of either the first or second UAVs being below a predetermined critical threshold. In some embodiments, the available power level may be given no weighting when determining the priorities of the first and second UAVs for using the docking terminal in response to the UAV ranking of either the first or second UAVs being above a predetermined ranking.

In some embodiments, the docking request may include information selected from a group consisting of UAV identification, UAV authentication information, UAV ranking, available power level, and how long the second UAV has been waiting to dock at the charging station. In some embodiments, instructing the first UAV to undock from the docking terminal may include information about another charging station. In some embodiments, instructing the first UAV to undock from the docking terminal may include authorizing the first UAV to remain on the UAV charging station but not in the docking terminal. In some embodiments, instructing the first UAV to undock from the docking terminal may include instructing the first UAV to change to a different docking terminal at the UAV charging station. In some embodiments, instructing the first UAV to undock from the docking terminal may include instructing the first UAV to remain on the UAV charging station for a battery swap.

Further embodiments may include a UAV charging station including a transceiver, and a processor coupled to the docking terminal and the transceiver and configured to perform operations of the methods summarized above. Further embodiments may include a UAV charging station having means for performing functions of the methods summarize above. Further embodiments may include a non-transitory processor-readable storage medium having stored thereon processor-executable instructions configured to cause a processor of a UAV charging station to perform operations of the methods summarize above.

Further embodiments include methods of managing UAV charging may include charging an onboard battery of the UAV while docked at a docking terminal of a charging station, receiving a message from the charging station with an instruction to undock from the docking terminal, and undocking from the docking terminal before charging of the onboard battery is complete in response to receiving the message from the charging station with the instruction to undock. Some embodiments may further include determining, in response to receiving the message from the charging station with the instruction to undock, whether an available power level of the onboard battery is sufficient to reach another charging station, and landing the UAV at a location removed from the docking terminal to wait for the docking terminal to become available to the UAV for charging in response to determining that the available power level of the onboard battery is insufficient to reach another charging station. In some embodiments, landing the UAV at a location removed from the docking terminal may include landing the UAV on the charging station in a waiting zone separate from the docking terminal. In some embodiments, the received message from the charging station with the instruction to undock includes authorization to remain at the UAV charging station but not in the docking terminal.

Further embodiments may include a UAV including a transceiver and a processor configured to perform operations of the methods summarized above.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of the various embodiments.

DETAILED DESCRIPTION

Figure 1:
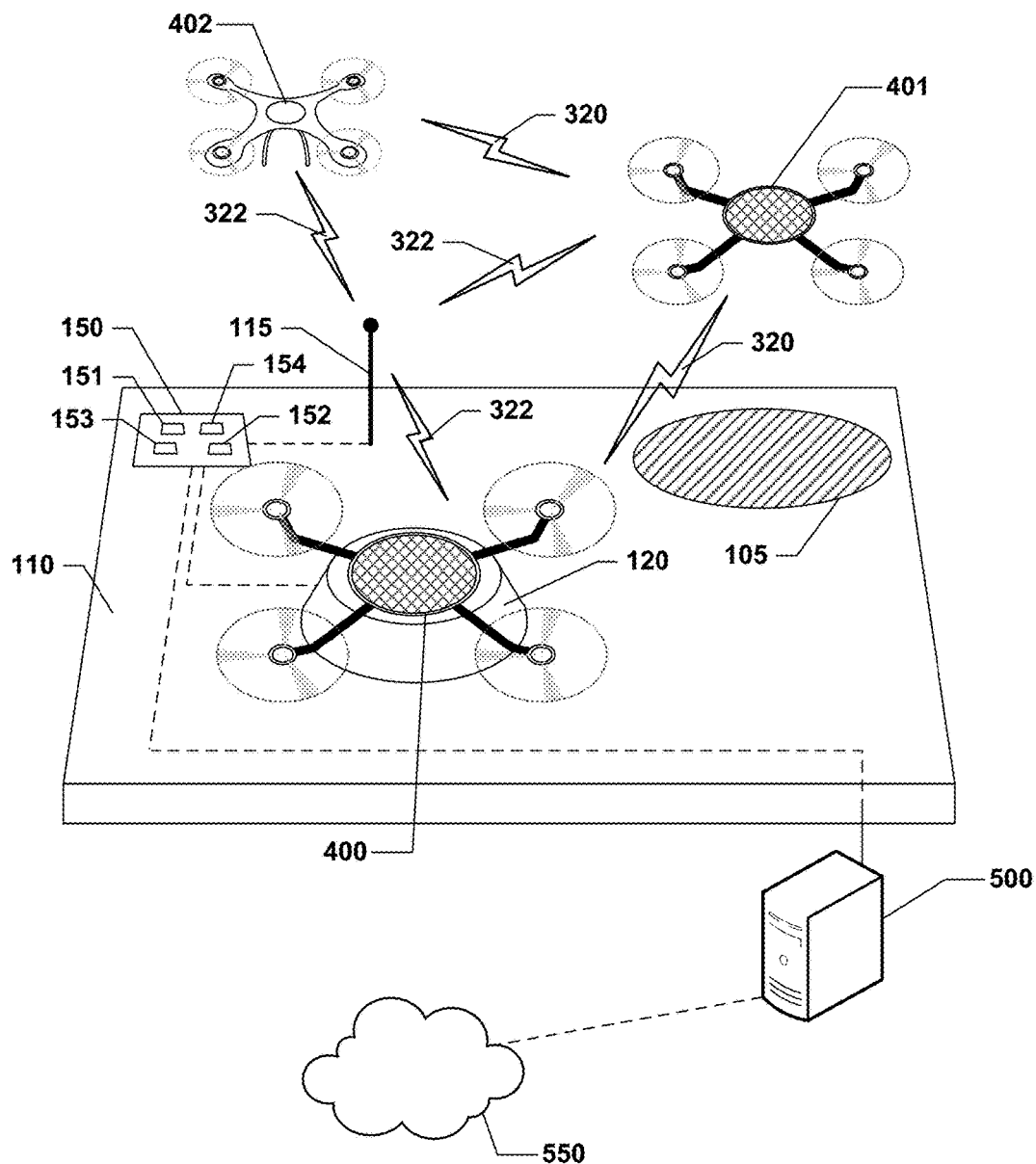
FIG. 1 is a schematic diagram of a UAV docked at a charging station according to various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments include a charging station for UAVs. The charging station may include a communication system and processor configured to determine a charging order or priority of a plurality of UAVs needing to use a docking terminal at the charging station. The charging order or priority may be based on a measure of available onboard power and a UAV rank of each UAV. A UAV with a low priority that is docked at a docking terminal of a charging station may be ordered to undock from the docking terminal. The UAV charging station may be configured to determine whether a currently charging UAV should undock from the docking terminal based on a weighted priority of the UAV in which the currently charging UAV's available power level (charge state) and priority are compared against another UAV's available power level (charge state) and priority of one or more UAV's.

The terms "unmanned aerial vehicle" and "UAV" are is used herein to refer to one of various types of aerial vehicles that may not utilize onboard, human pilots. A UAV may include an onboard computing device configured to operate the UAV without remote operating instructions (i.e., autonomously), such as from a human operator or remote computing device. Alternatively, the onboard computing device may be configured to operate the UAV with remote operating instruction or updates to instructions stored in a memory of the onboard computing device. The UAV may be propelled for movement in any of a number of known ways. For example, a plurality of propulsion units, each including one or more propellers or jets, may provide propulsion or lifting forces for the UAV and any payload carried by the UAV for travel or movement. In addition or alternatively, the UAV may include wheels, tank-tread, floatation devices or other non-aerial movement mechanisms to enable movement on the ground or across water. The UAV may be powered by one or more types of power source, such as electrical, chemical, electro-chemical, or other power reserve, which may power the propulsion units, the onboard computing device and/or other onboard components.

As used herein, the term "charging station" or "UAV charging station" refers to a location that includes at least one docking terminal with a charger for charging a UAV (e.g., battery thereof). As used herein, the term "docking terminal" refers to a position at the charging station at which the UAV may dock and be charged by the charger. The docking terminal may include (but is not limited to) elements for mechanically coupling, holding, and/or supporting a UAV docked at the docking terminal. In some embodiments, the term "charger" refers to a device for charging an onboard battery of a UAV while the onboard battery remains onboard the UAV (i.e., without removing the battery for charging). The charger at the docking terminal may include (but is not limited to) an electrical receptacle, cord, wireless charger, or mating device for transferring electric charge to a UAV.

As used herein, the terms "dock," "docked," or "docking" refer to the act of connecting to and/or parking at a docking terminal of a charging station for more than a brief period. While docked at a docking terminal, a UAV may be charging or may have stopped charging but remains at the docking terminal (i.e., finished charging or ready to leave). While docked, UAVs may mechanically couple to the charger (e.g., a direct connection is formed) or the UAVs may land on or hang from a support structure without a secure connection to the charger (e.g., for wireless charging).

The term "computing device" is used herein to refer to an electronic device equipped with at least a processor. Examples of computing devices may include a UAV recharging control, travel control, and/or mission management computers, mobile devices (e.g., cellular telephones, wearable devices, smart-phones, web-pads, tablet computers, Internet enabled cellular telephones, Wi-Fi® enabled electronic devices, personal data assistants (PDA's), laptop computers, etc.), personal computers, and server computing devices. In various embodiments, computing devices may be configured with memory and/or storage as well as networking capabilities, such as network transceiver(s) and antenna(s) configured to establish a wide area network (WAN) connection (e.g., a cellular network connection, etc.) and/or a local area network (LAN) connection (e.g., a wired/wireless connection to the Internet via a Wi-Fi® router, etc.).

Figure 5:
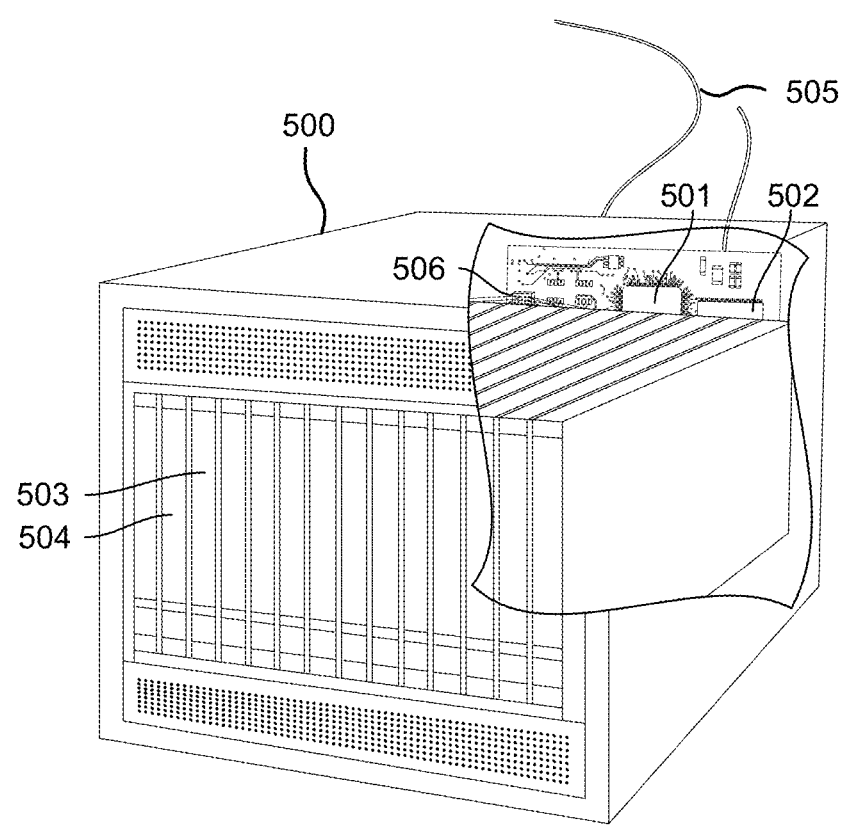
FIG. 5 is a component diagram of an example server suitable for use with the various embodiments.

The term "server" as used herein refers to any computing device capable of functioning as a server, such as a master exchange server, web server, and a personal or mobile computing device configured with software to execute server functions (e.g., a "light server"). Thus, various computing devices may function as a server, such as any one or all of cellular telephones, smart-phones, web-pads, tablet computers, Internet enabled cellular telephones, WAN enabled electronic devices, laptop computers, personal computers, and similar electronic devices equipped with at least a processor, memory, and configured to communicate with a UAV. A server may be a dedicated computing device or a computing device including a server module (e.g., running an application that may cause the computing device to operate as a server). A server module (or server application) may be a full function server module, or a light or secondary server module (e.g., light or secondary server application). A light server or secondary server may be a slimmed-down version of server type functionality that can be implemented on a personal or mobile computing device, such as a smart phone, thereby enabling it to function as an Internet server (e.g., an enterprise e-mail server) to a limited extent, such as necessary to provide the functionality described herein. An example of server suitable for use with the various embodiments is described with reference to FIG. 5.

Various embodiments may be implemented using a variety of charging stations and/or charging station configurations. A charging station may have more than one docking terminal with one or more chargers for charging one or more UAVs. In some embodiments, the docking terminal(s) may have a bracket or seating or otherwise be configured to receive and hold a UAV in-place while charging. The docking terminal and/or the charger may be configured with coupling elements configured to mate with elements of the UAV for transferring electrical power, such as to an onboard battery of the UAV.

Various embodiments may be implemented using a variety of UAV configurations. A propulsion source for a UAV may be one or more propellers that generate a lifting or propelling force sufficient to lift and/or move the UAV (including the UAV structure, motors, electronics, and power source) and any loads that may be attached to the UAV (e.g., a payload). The propulsion source may be powered by an electrical power source, such as a battery. While the present disclosure is directed to examples of electric motor controlled UAVs, the claims and embodiments may be applied equally to UAVs powered by various additional types of power source that may be resupplied with a product that may be used or consumable to create energy.

Propulsion sources may be vertical or horizontally mounted depending on the movement mode of the UAV. A common UAV configuration suitable for use in the various embodiments is a "quad copter" configuration. In an example quad copter configuration, four horizontally-configured rotary lift propellers and motors fixed to a frame. However, UAV's may have any number of rotary lift propellers and motors are fixed to the frame. The frame may include a frame structure with landing skids that supports the propulsion motors, power source (e.g., battery), payload securing mechanism, and so on. A payload may be attached in a central area underneath the frame structure platform of the UAV, such as an area enclosed by the frame structure and skids underneath the power sources or propulsion units. A quad copter-style horizontal rotor UAV may travel in any unobstructed horizontal and vertical direction or may hover in one place. A quad copter UAV configuration is used for illustrative purposes in the examples described herein; however, other UAV designs may be used.

A UAV may be configured with processing components that enable the UAV to navigate, such as by controlling the motors to achieve directionality, and communication components that enable the UAV to receive position information and information from external systems including servers, access points, other UAVs, and so on. The position information may be associated with the current UAV position, waypoints, travel paths, avoidance paths/sites, altitudes, destination sites, locations of charging stations, relative locations of other UAVs, potential charging station sites, and/or the like. The position information may be based on a relative position or an absolute position (i.e., geographic coordinates) obtained from a sensor (onboard or remote) or from communications with a computing device (e.g., server, global navigation satellite system (GNSS), or positioning beacon).

The UAV may periodically or continuously monitor onboard available power levels and determine whether the UAV has enough power to reach its destination in accordance with mission power parameters. The mission power parameters may include power requirements for reaching the destination of a course of the UAV. Also, the mission power parameters may include or take into account a threshold level of reserve power allowing a margin of error (e.g., determined from a statistical error analysis). In addition, the mission power parameters may include information about payload encumbrances, route parameters, conditions that impact power consumption (e.g., inclement weather), deadlines (i.e., timing considerations), priority levels, and other information about one or more missions assigned to the UAV.

In case of an emergency or when available onboard power is insufficient to meet one or more mission power parameters, the UAV may assess available information to determine whether the UAV can dock at a docking terminal in a charging station to recharge onboard batteries. For example, when head winds are heavier than expected, the UAV will expend more power than expected to reach its destination, and therefore may need to recharge in order to reach the original destination.

Various embodiments include a charging station 110 including one or more docking terminals 120 with chargers configured to recharge a UAV, such as UAVs 400, 401, 402. Examples of chargers include electrical receptacles, cords, wireless chargers, or mating devices for transferring electric charge to a UAV. The charging station 110 may have more than one docking terminal 120 and each docking terminal 120 may have more than one different type of charger. For example, one charger may be configured to charge special types of UAVs, couple to special types of UAV mating devices, or charge UAVs at a different rate than other chargers. The charging station 110 illustrated in FIG. 1 is in the form of flat open deck platform; however, other configurations of charging stations may be used.

Multiple UAVs 400, 401, 402 may attempt to dock at the docking terminal 120 to recharge onboard batteries of the UAVs 400, 401, 402, but only one of the UAVs 400, 401, 402 at a time can dock at the docking terminal 120. Alternatively, one of the UAVs 400, 401, 402 that was unable to dock at the docking terminal 120 may be able to land in a waiting zone 105. The waiting zone 105 may be helpful for UAVs too low on power to wait by hovering near the charging station 110 until a docked UAV (e.g., 400) departs. In particular embodiments, the waiting zone 105 does not provide any charging capabilities for recharging a waiting UAV. While in the waiting zone, the waiting UAV may be in a reduced power state relative to when in flight and/or when charging on the docking terminal.

In various embodiments, the charging station 110 includes a control unit 150. The control unit 150 may include a processor 151, one or more transceivers 152 (e.g., Peanut, Bluetooth, Bluetooth LE, ZigBee, Wi-Fi®, radio frequency (RF) radio, etc.), a platform antenna 115, and a power module 153. The processor 151 may include memory 154 and sufficient processing power to conduct various control and computing operations for the charging station 110. The processor 151 may be coupled to and control the docking terminal 120 for charging UAVs docked thereon, such as by being equipped with charging control algorithm and a charge control circuit. The processor 151 may be directly powered from a power source supplying power for charging the UAVs or from the power module 153. The processor 151 may also be coupled to one or more motor or actuation mechanisms for holding or releasing UAVs docked on the docking terminal 120.

The charging station control unit 150 may control and be coupled to sensors (not shown) such as cameras for observing the area surrounding the charging station 110 and monitoring the UAVs 400, 401, 402 approaching for landing.

The processor 151 may communicate with UAVs 400, 401, 402 through the one or more transceivers 152. A bi-directional wireless link 422 may be established between the platform antenna 115 and each of the UAVs 400, 401, 402, such device-to-device (D2D) communications may use Long Term Evolution (LTE) Direct, Wi-Fi direct, or the like. The UAVs 400, 401, 402 may also use inter-UAV wireless links 420 for directly communicating to one another. The inter-UAV wireless links 420 may also use D2D communication protocols. The charging station 110 may also include network access ports (or interfaces) coupled to the processor 151 for establishing data connections with a network, such as the Internet 550 and/or a local area network coupled to other systems computers and a server 500.

Charging stations (e.g., 110) may be located on building rooftops, which are isolated locations that may provide security. However, high altitudes often experience severe wind conditions that may damage or destroy a UAV. While the charging station 110 is illustrated as a flat open deck, numerous other configurations may be suitable for charging the UAVs in accordance with various embodiments. In various embodiments, the charging station 110 may deploy a grappling component or stabilizer to secure the UAV 400 to the charging station 110.

Different types of locations may be suitable for a UAV charging station 110, such as (but not limited to) commercial buildings, power or communication towers, and/or the like. UAV charging stations are not limited to being located on building rooftops or even man-made objects. For example, natural locations like cliffs, hilltops, rocks, open fields, or on a flotation device on a lake, pond, or river, and/or the like may be suitable as a UAV charging station 110.

Figure 2:
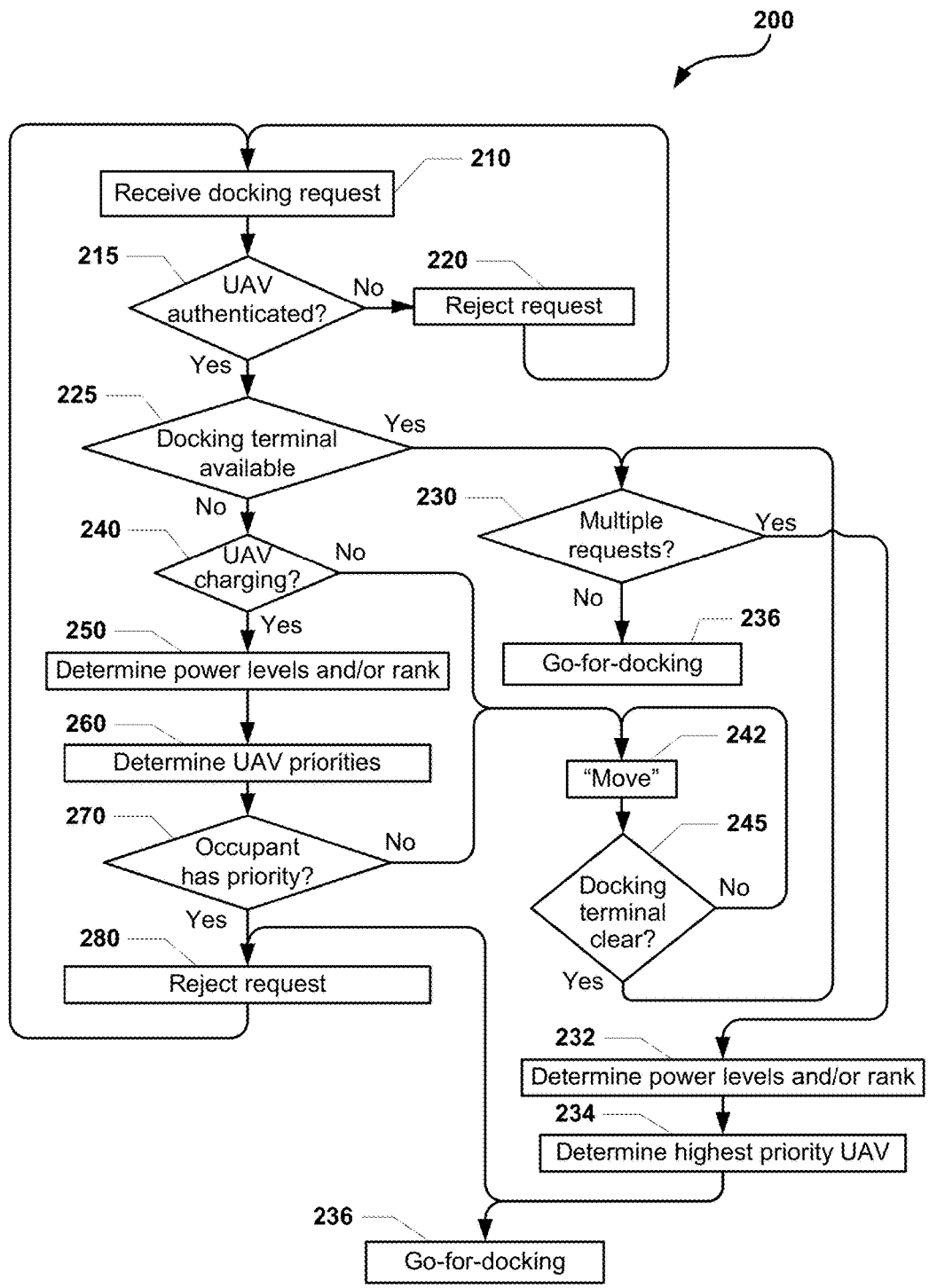
FIG. 2 is a process flow diagram illustrating a method of managing a UAV charging station according to various embodiments.

FIG. 2 illustrates a method 200 for managing a UAV charging station according to various embodiments. With reference to FIGS. 1-2, operations of the method 200 may be performed by a platform control unit (e.g., 150), a server (e.g., server 500), or other computing devices.

In block 210, a processor (e.g., 151) of the charging station (e.g., 110) may receive a docking request. The processor may receive the docking request via the one or more transceivers (e.g., 152) and the platform antenna (e.g., 115). Receipt of the docking request may occur, for example, in response to performing device discovery to detect UAVs in proximity of the charging station. The docking request may include additional information, such as identification and authentication information as well as details regarding an available power level of the requesting UAV and/or rank of the requesting UAV. Alternatively, such additional information may be requested and/or received separately. The processor may be configured to receive more than one docking request simultaneously, but may handle each request individually in a similar fashion. The handling of each request may be performed simultaneously, but for ease of explanation the description of how only a single request is handled is described herein.

In determination block 215, the processor may determine whether the UAV transmitting the docking request has been properly authenticated and identified. Authentication and identification information may be requested separately as part of determination block 215. In response to determining the requesting UAV is not properly authenticated or identified (i.e., determination block 215="No"), the processor may transmit a rejection of the request in block 220, using the one or more transceivers and the platform antenna, and await a further docking request in block 210.

In response to determining that the requesting UAV is properly authenticated and identified (i.e., determination block 215="Yes"), the processor may determine whether a docking terminal at the charging station is currently available (i.e., not occupied) in determination block 225.

In response to determining no docking terminal is currently available (i.e., determination block 225="No"), the processor may determine whether an occupying UAV (i.e., a UAV occupying the docking terminal) is charging or idle (i.e., not charging) in determination block 240.

In response to determining that a docking terminal is currently available (i.e., determination block 225="Yes"), in determination block 230, the processor may determine whether multiple docking requests have been authenticated in determination block 215 and are still pending.

In response to determining that no other docking requests are pending (i.e., determination block 230="No"), the processor may transmit a message to the requesting UAV indicating a docking terminal at the charging station is available (i.e., Go-for-docking") in block 236. Prior to transmitting the Go-for-docking message, the processor may open any hatches or release mechanisms prior to a UAV initiating dock protocols with the docking terminal. Based on the Go-for-docking message, the requesting UAV may be allowed to dock at the docking terminal.

In response to determining that multiple docking requests are pending (i.e., determination block 230="Yes"), the processor may determine an available power level for each of the multiple UAVs with pending docking requests in block 232. Additionally or alternatively in block 232, the processor may determine a rank associated with each of the multiple UAVs with pending docking requests. If the processor does not already have this information (i.e., processor was not provided with the initial docking request), the processor may transmit a request to the appropriate UAVs as needed (and/or servers associated with the UAVs).

In block 234, the processor may determine the UAV that has the highest priority based on the determined available power levels and the determined ranks. In determining the UAV with the highest priority, the processor may determine priorities of the multiple UAVs with pending docking requests. The priority determination in block 234 may be a weighted priority, with available power level having more influence than rank, with rank having more influence than available power level, or with both power level and rank having equal weighting. In addition, other factors such as how long a UAV has been waiting may influence that UAVs rank. Alternatively, the priority determination in block 234 may be based on one or more thresholds. For example, if an available power level is below a predetermined low threshold, the available power may be weighted more heavily than the UAV ranking. Also, if an available power level is below a predetermined critical threshold, the ranking may be given no weighting when determining the charging order or priority for the charging station. As a further alternative, if either UAV has a ranking above a certain predetermined ranking, the available power level may be given no weighting when determining the charging order or priority. According to various embodiments, UAV ranks may be determined in any suitable manner and/or be based on any suitable criteria (e.g., based on a higher landing fee or subscription fee, higher valued payload, etc.).

When multiple UAVs are being assessed, the processor may transmit (e.g., using the one or more transceivers and the platform antenna) at least two different types of messages in response to the priority determination in block 234, namely a Go-for-docking message in block 236 to the UAV with the highest priority and one or more request rejections in block 280 to any other UAVs.

Returning to determination block 240, in response to determining that the occupying UAV is charging (i.e., determination block 240="Yes"), the processor may determine an available power level and/or a rank associated with the charging UAV and each other UAV with a pending docking request in block 250.

In block 260, the processor may determine UAV priorities, which may include determining the priorities of multiple UAVs and/or the UAV that has the highest priority. The determined UAV priorities may be based on the determined available power levels, the determined ranks, and/or a combination thereof. In determination block 270, the processor may determine whether the docking terminal occupant matches the UAV with the highest priority based on the determination of the UAV that has the highest priority.

In response to determining that the docking terminal occupant has the highest priority (i.e., determination block 270="Yes"), the processor may, in block 280, transmit request rejection messages to any other UAVs that had made a docking request.

In response to determining that the docking terminal occupant does not have the highest priority (i.e., determination block 270="No") or in response to determining that the occupying UAV is not charging (i.e., determination block 240="No"), the processor may transmit (e.g., using the one or more transceivers and the platform antenna) a "move" message to the occupying UAV in block 242.

The move message in block 242 may require the occupying UAV to leave (i.e., vacate) the docking terminal. The move message may include instructions to undock accompanied by information about another docking terminal (e.g., at the current charging station or at another charging station remote from the charging station 110) that may be available as an alternate. The fact that another docking terminal (or other charging station) is available may be considered when making the priority determination in blocks 234, 260. Alternatively, the move message may also indicate that the vacating UAV may remain at the charging station but not at the docking terminal connected to the charger (e.g., move to the waiting zone 105). Alternative services may be offered in the waiting zone, such as a battery swap. In this way, although a UAV has to move to the waiting zone, the waiting UAV may receive a fully charged battery or other needed components.

Although the move message may instruct the vacating UAV to move to another docking terminal that is technically suitable for the vacating UAV, the other docking terminal may not be as desirable or optimal for the vacating UAV. For example, the other docking terminal may not have optimal connections or may charge more slowly than the docking terminal being vacated. Alternatively, the other docking terminal may not be suitable for charging the vacating UAV (e.g., the connection(s) or charger may not be compatible with the vacating UAV) but may be used as a waiting zone (e.g., 105) by the vacating UAV. Thus, included within the move message or as part of a separate message, the charging station may transmit information about the other docking terminal (e.g., specifications, connection types, charging rate, available charging time, etc.) to the vacating UAV for a control unit or operator of the vacation UAV to determine whether docking at the other docking terminal is appropriate.

In determination block 245, the processor may determine whether the docking terminal of the charging station is clear (i.e., the occupying UAV has undocked from the docking terminal). This determination enables the processor to detect when, for some reason, the occupying UAV has not moved, such as when the occupying UAV did not receive the message to move or the occupying UAV may be unable to move.

In response to determining that the occupying UAV has not yet moved (determination block 245="No"), the processor may once again transmit a "move" message to the occupying UAV in block 242. Alternatively, the processor may provide an indicator to a person or other device (e.g., a towing UAV or vehicle) at the charging station to manually move the occupying UAV.

In response to determining that the occupying UAV has moved (determination block 245="Yes"), the processor in determination block 230 may determine whether multiple docking requests have been authenticated and are still pending, as described above. With the previously occupying UAV no longer in the docking terminal, if a single UAV has requested docking the processor may transmit a Go-for-docking in block 236. Otherwise, the processor may eventually transmit one of two different types of messages, namely a Go-for-docking message in block 236 to the UAV with the highest priority and one or more request rejections in block 280 to any other UAVs.

The processor may maintain a register of a current status of any UAV currently docked or parked at the charging station and/or at a particular docking terminal if the charging station includes more than one docking terminal and/or a waiting zone. For example, this register may indicate when a docking terminal is occupied by a UAV charging or by a UAV that is idle and not charging.

Figure 3:
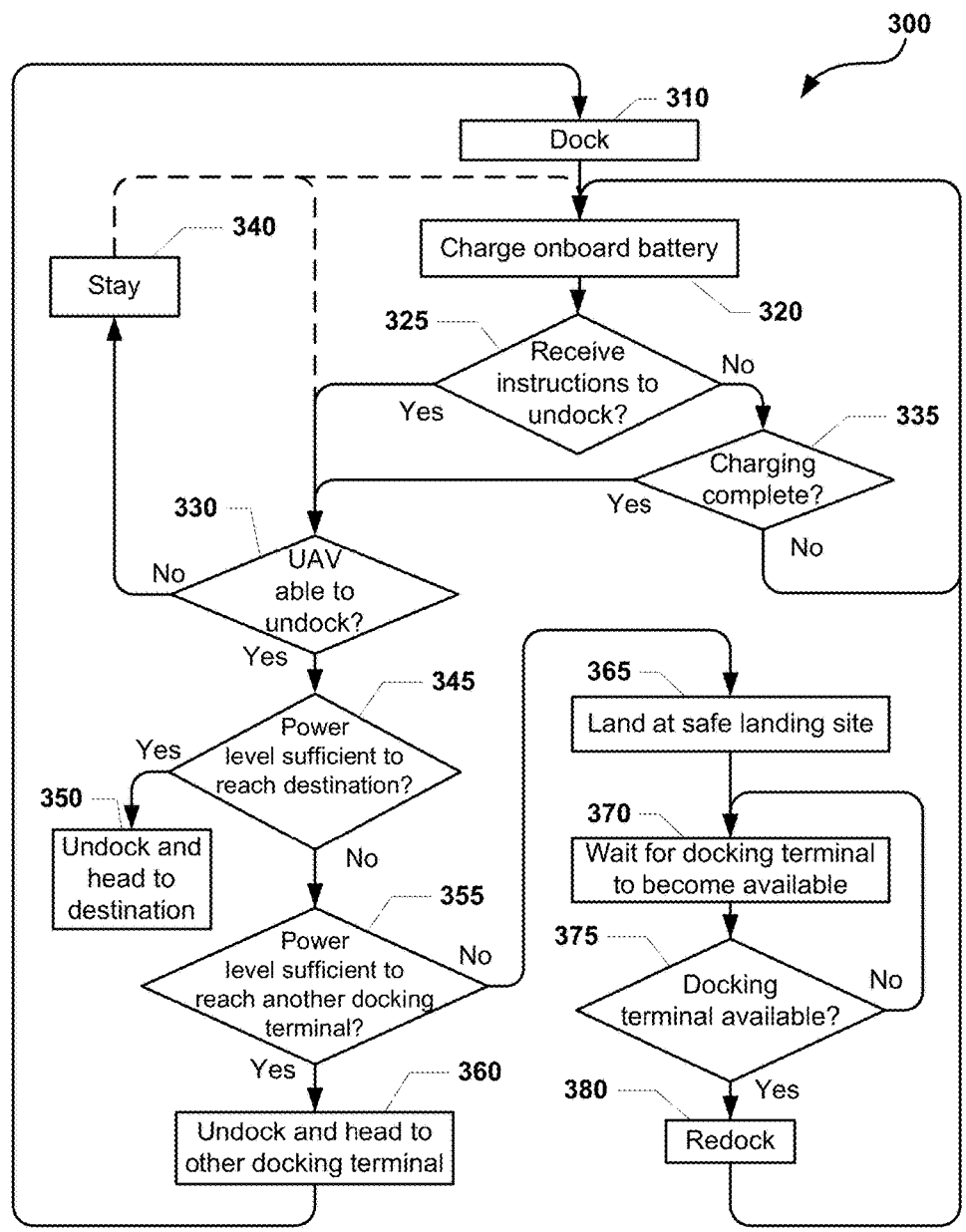
FIG. 3 is a process flow diagram illustrating a method of managing UAV charging according to various embodiments.

FIG. 3 illustrates a method 300 of managing UAV charging according to various embodiments. With reference to FIGS. 1-3, operations of the method 300 may be performed by one or more processors (e.g., 460 in FIG. 4) and/or a control unit (e.g., 450 in FIG. 4) of a UAV (e.g., 400, 401, 402). For ease of explanation, various operations of the method 300 are described as being performed by the processor, although one or more additional components may also be used.

In block 310, the processor may dock the UAV at the docking terminal (e.g., 120) of a charging station (e.g., 110) for charging. The docking of the UAV at the docking terminal may include connecting to a charger. The connection to a charger may include coupling with mechanical contacts or positioning the UAV for wireless charging.

In block 320, an onboard battery (e.g., 470 in FIG. 4) of the UAV may be charged by the charger, while docked at the docking terminal of the charging station. In addition to the UAV charging the onboard battery by the charger of the docking terminal, the UAV may also deploy or make use of onboard solar panels or other energy harvesting components (e.g., wind harvesting) in order to supplement the charging of the onboard battery.

In determination block 325, the processor may determine whether a message is received with an instruction to undock from the docking terminal. In response to determining that no message is received with an instruction to undock (i.e., determination block 325="No"), the processor may determine whether charging is complete in determination block 335. The processor may determine charging is complete in response to the battery being charged to a designated level. Such a designated level may correspond to a level of charge needed to reach a particular destination, a preset percentage (e.g., 90% charged) or amount of charge, a level of charge associated with a predetermined flight-time of the UAV, etc. The designated level of charge may take into account a charging limit designed to extend a long-term life of the battery. Thus, the designated level may be a fully charged state or less than a fully charged state (i.e., less than or equal to 100% charged).

In response to determining that a message is received with an instruction to undock (i.e., determination block 325="Yes"), the processor may determine whether the UAV is able to undock from the docking terminal in determination block 330. The UAV may be unable to undock due to a mechanical or other problem and/or an onboard battery is not sufficiently charged for the UAV to undock. The processor may take into account the available power level of the onboard battery to ensure that the UAV can undock and return to the docking terminal when the docking terminal becomes available. When deciding whether the UAV is able to undock, the processor may assess where and for how long the UAV may have to remain while waiting to return to the docking terminal. Thus, even though the UAV may be capable of undocking from the docking terminal (i.e., no mechanical or other problem and sufficient power to undock), the processor may determine that the UAV is unable to dock if the UAV would not be able to return to the occupied docking terminal or reach another docking terminal.

The determinations regarding whether a message is received with an instruction to undock in determination block 325 and the determination whether charging is complete in determination block 335 may be a passive determinations. Thus, if no instruction to undock is received and charging is not complete, the UAV continues to charge the onboard battery in block 320 until either the message from the charging station with the instruction to undock is received or charging is complete.

In response to determining that charging is not complete (i.e., determination block 335="No"), the UAV may continue charging the onboard battery in block 320. In response to determining that charging is complete (i.e., determination block 335="Yes"), the processor may determine whether the UAV is able to undock from the docking terminal in determination block 330. For example, although the onboard battery of the UAV is fully charged (or sufficiently charged to reach its next destination or charging station), the UAV may be blocked from undocking or unable to undock due to a mechanical or other problem.

In response to determining that the UAV is not able to undock (i.e., determination block 330="No"), the UAV may stay docked at the docking terminal in block 340 and optionally either continue charging the onboard battery in block 320 if charging of the onboard battery is not complete, or once again determine whether the UAV is able to undock from the docking terminal in determination block 330 if/when charging of the onboard battery is complete. Thus, if the UAV is unable to undock, but is fully (or sufficiently) charged, the processor may keep the UAV docked at the docking terminal until the UAV is able to undock. If the UAV remains at the docking terminal long enough and depletes sufficient power, the UAV may once again charge the onboard battery in block 320. Additionally, the UAV may inform the charging station as to why the UAV did not undock and/or provide an acknowledgement to the charging station that the message with the instructions to undock were received.

In response to determining that the UAV is able to undock (i.e., determination block 330="Yes"), the processor may determine whether an available power level of the onboard battery is sufficient to reach a destination of the UAV (e.g., a mission destination, home base, an intermediate charging station, etc.) in determination block 345. Although the onboard batteries of the UAV may not be full, the onboard batteries may hold an available power level sufficient to reach the destination. Alternatively, even if the onboard batteries of the UAV are full and/or charging is complete (e.g., determination block 335="Yes"), the available power level may not be sufficient to reach a final destination, in which case an intermediate or other destination (e.g., an intermediate charging station) may be considered the destination for determining whether the available power level of the onboard battery is sufficient in determination block 345.

In response to determining that the available power level of the onboard battery is sufficient to reach the destination of the UAV (i.e., determination block 345="Yes"), the processor may direct the UAV to undock and head to the destination in block 350.

In response to determining that the available power level of the onboard battery is not sufficient to reach the destination of the UAV (i.e., determination block 345="No"), the processor may determine whether the available power level of the onboard batter is sufficient to reach another docking terminal in determination block 355.

In response to determining that the available power level of the onboard battery is sufficient to reach another docking terminal (i.e., determination block 355="Yes"), the processor may direct the UAV to undock and head to the other docking terminal in block 360.

In response to determining that the available power level of the onboard battery is not sufficient to reach another docking terminal (i.e., determination block 355="No"), the processor may direct the UAV to land at a safe landing site in block 365. Such a safe landing site may be the waiting zone (e.g., 105) at the same charging station as the docking terminal being vacated, a waiting zone at another charging station, a formal waiting zone (i.e., designated for UAV waiting) remote from any charging station, or an informal waiting zone (i.e., a remote location at which the UAV may safely land and wait like at a waiting zone).

The UAV may be provided ahead of time with charging location data regarding possible charging stations and/or docking terminals. Information about one or more charging stations, including one or more docking terminals at a charging station is herein referred to as "charging location data." In addition, the UAV may be provided with waiting zone information regarding charging stations with waiting zones or locations to safely land to use like a waiting zone (i.e., formal or informal waiting zones). Information about waiting zones at charging stations and safe landing sites remote from charging stations is herein referred to as "waiting zone information." A server (e.g., 500) may compile such charging location data and/or waiting zone information from prior visits by the UAV 400, information received from other UAVs, information collected by sensors located at charging stations or safe landing sites (e.g., sensors deployed by the UAV or placed there by other means), or information otherwise obtained and maintained by the server 500. Alternatively, the UAV may autonomously identify one or more charging stations, docking terminals, and/or safe landing sites, such as the first available docking terminal or safe landing site that is not far from the original course to a destination. Thus, the UAV may perform a real-time site survey in order to assess a site and determine whether that site is suitable for charging and/or waiting. In various embodiments, the UAV may transmit information determined from the real-time site survey and/or otherwise received/collected to the server for updating. The information transmitted to the server may become inaccurate (i.e., decay) over time and thus may be associated by the UAV and/or the server with a time, such as when the information was received and/or collected.

In block 370, the processor may wait for the docking terminal (i.e., either the previously vacated docking terminal or another docking terminal) to become available. The wait may be a designated period after which the processor transmits a request to dock at the previously vacated docking terminal and/or another docking terminal for charging. During the designated period, the processor may power-down to the extent possible. Alternatively, the processor may passively wait for a message from the charging station (i.e., monitor for receipt of a message from the charging station without actively transmitting a message or request to dock). While waiting, the processor may power-down and/or conserve power as much as possible.

In determination block 375, the processor may determine whether the docking terminal has become available. In response to determining that the docking terminal is not available (i.e., determination block 375="No"), the processor may continue to wait for the docking terminal to become available in block 370.

In response to determining that the docking terminal is available (i.e., determination block 335="Yes"), the UAV may redock with the docking terminal in block 380 and resume charging the onboard battery in block 320.

Before reaching a destination, the UAV 400 may change course based on updated information received regarding mission power parameters or charging station data. The UAV 400 may access an update to the mission power parameters or a charging station availability update at any point along any course or while at a site. For example, based on a sensor reading at a particular charging station, the UAV 400 may determine current charging rates are lower than expected. In response to this determination, the UAV 400 may reassess the suitability of the current charging station. Alternatively, one or more of the other UAVs 401, 402 may have reported better than normal charging relating to an alternative charging station. As a further alternative, the server 500 may provide information indicating either mission power parameters or charging station conditions have changed such that the UAV 400 may need to reassess the suitability of the charging station and may change course toward another charging station.

Mission power parameters may include details regarding power requirements of one or more missions. The power requirements may further include route parameters, reserve power thresholds, payload encumbrances, temporal parameters, and mission priorities. The UAV 400 may compare such power requirements to current onboard power levels in order to determine whether the UAV 400 has sufficient onboard power to safely complete all missions or select missions. Temporal parameters may include mission timing, deadlines, time-of-day, date, or other information associated with time. In addition, since mission power parameters may change, the UAV 400 may be provided with updates to mission power parameters from time to time.

In various embodiments, the mission power parameters may include projected energy expenditures associates with a particular course to a destination. Such projected energy expenditures may be determined based on distance or travel times, and recalculated in real-time. In addition, route parameters may include other factors associated with a course, such as higher or lower than normal power consumption rates. Mission power parameters may identify a minimum power level (or reserve power level) that must be maintained at each stage in a mission in order to provide safe margins for handling unexpected problems, such as weather issues, payload issues, or hardware issues that could require an emergency divert or consume more power than expected. If power reserves on the UAV fall below such minimums, parking without charging at a suitable site may be required if recharging at a charging station is not an option, or other alternative power replacement methods are available (e.g., battery swap, or even refueling for UAVs with a combustion engine).

In various embodiments, reserve power thresholds may be a value associated with a predetermined percentage or quantity of onboard power recommended be kept in reserve for a mission at various phases in the travel path (e.g., midway, at the destination, before starting to park, etc.). Alternatively, the value of the reserve power thresholds may be measured in terms of motor hours (i.e., a period of time in which one or more motors expend onboard power), a distance/range that the UAV may achieve using onboard power stores, or flight-time remaining. Higher reserve power thresholds may be used for missions with more uncertainty regarding needed power. For example, risk factors from route parameters may increase the value of the reserve power threshold specified for a mission. A total mission power requirement may include an amount of power reflected by the reserve power threshold, in addition to projected power expenditures for the mission.

Figure 4:
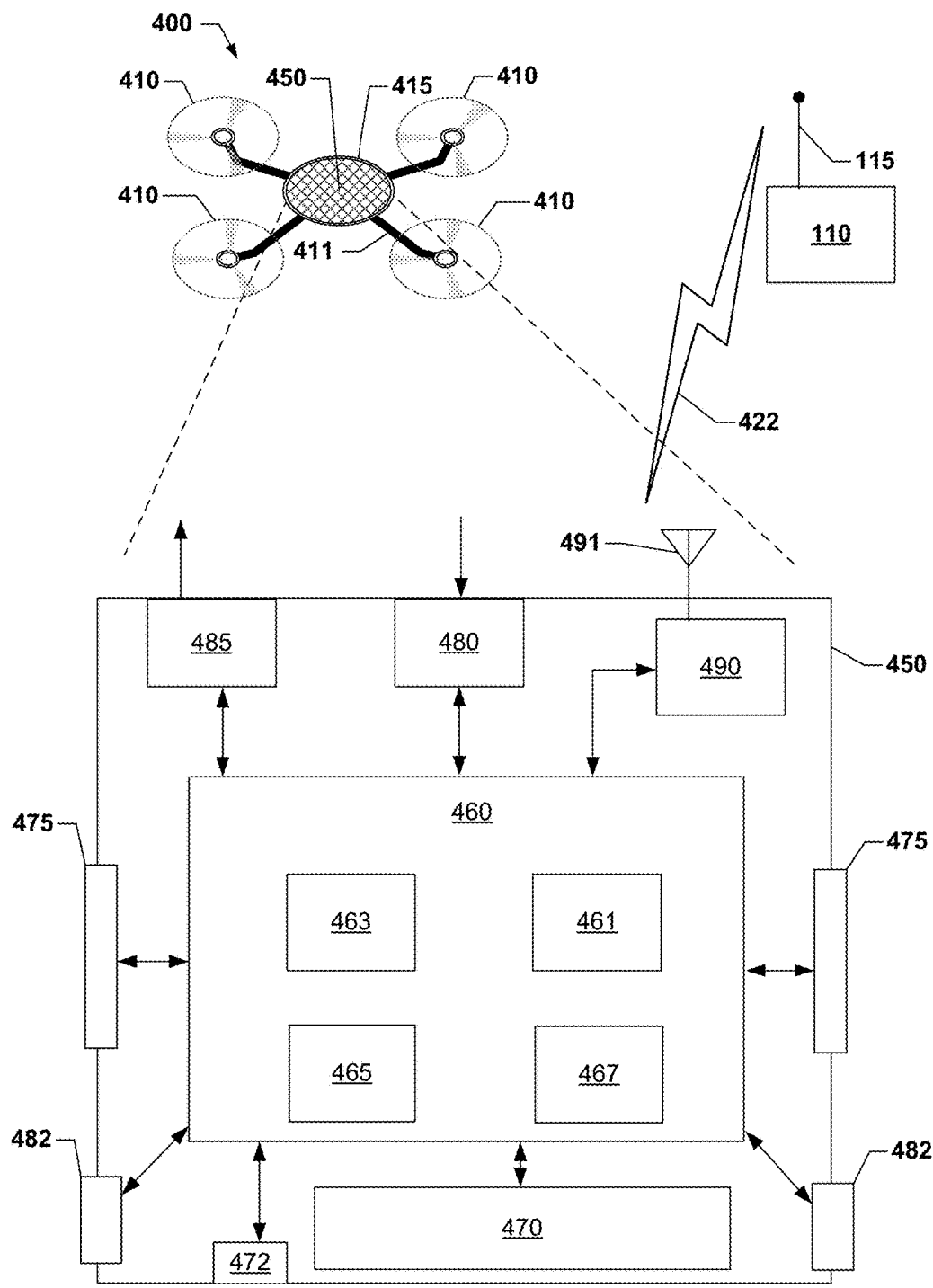
FIG. 4 is a perspective view of a UAV and a schematic relief diagram of a control unit and remote communication device according to various embodiments.

FIG. 4 illustrates a UAV, such as the UAV 400 (or 401, 402) of FIG. 1, in accordance with various embodiments. With reference to FIGS. 1-4, the UAV 400 may include a number of rotors 410, rotor arms 411, and a frame 415. The frame 415 may provide structural support for the motors associated with the rotors 410, landing gear, and a control unit 450. The frame 415 may be sufficiently strong to support the maximum load weight for the combination of the components of the UAV 400 and, in some cases, a payload. For ease of description and illustration, some detailed aspects of the UAV 400 are omitted such as wiring, frame structure, interconnects, or other features that would be known to one of skill in the art. For example, while the UAV 400 is shown and described as having a frame 415 having a number of support members or frame structures, the UAV 400 may be constructed using a molded frame in which support is obtained through the molded structure. In the illustrated embodiments, the UAV 400 has four rotors 410. However, more or fewer than four rotors 410 may be used.

The UAV 400 may further include a control unit 450 (e.g., 150 in FIG. 1) that may house various circuits and devices used to power and control the operation of the UAV 400. The control unit 450 may include a processor 460 (e.g., 151 in FIG. 1), a power module 470, a charging interface 472, payload-securing units 475, an input module 480, sensors 482, an output module 485, and a radio module 490. The processor 460 may include or be coupled to memory 461 and a navigation unit 463. The processor 460 may be configured with processor-executable instructions to control travel and other operations of the UAV 400, including operations of the various embodiments. The processor 460 may be coupled to one or more payload-securing units 475 and sensors 482. The payload-securing units 475 may include an actuator motor that drives a gripping and release mechanism and related controls that are responsive to the control unit 450 to grip and release a payload in response to commands from the control unit 450.

The sensors 482 may be optical sensors, radio sensors, a camera, or other sensors. Alternatively or additionally, the sensors 482 may be contact or pressure sensors that may provide a signal that indicates when the UAV 400 has made contact with a surface. The power module 470 may include one or more batteries that may provide power to various components, including the processor 460, the payload-securing units 475, the input module 480, the sensors 482, the output module 485, and the radio module 490. In addition, the power module 470 may include energy storage components, such as rechargeable batteries. An external power source, such as a charger from a charging station (e.g., 110 in FIG. 1) may supply power to the UAV 400 through the charging interface 472. The charging interface 472 may have mechanical contacts for receiving electricity through conduction. Alternatively, or additionally, the charging interface 472 may be configured to receive power through wireless charging. The processor 460 may be configured with processor-executable instructions to control the charging of the power module 470 (i.e., the storage of harvested energy), such as by executing a charging control algorithm using a charge control circuit. Alternatively or additionally, the power module 470 may be configured to manage its own charging. The processor 460 may be coupled to an output module 485, which may output control signals for managing the motors that drive the rotors 410 and other components, such as a grappling component (not shown).

Through control of the individual motors of the rotors 410, the UAV 400 may be controlled as the UAV 400 progresses toward a destination. The processor 460 may receive data from the navigation unit 463 and use such data in order to determine the present position and orientation of the UAV 400, as well as the appropriate course towards the destination or intermediate sites. In various embodiments, the navigation unit 463 may include a GNSS receiver system (e.g., one or more global positioning system (GPS) receivers) enabling the UAV 400 to navigate using GNSS signals. Alternatively or in addition, the navigation unit 463 may be equipped with radio navigation receivers for receiving navigation beacons or other signals from radio nodes, such as navigation beacons (e.g., very high frequency (VHF) omni-directional range (VOR) beacons), Wi-Fi® access points, cellular network sites, radio station, remote computing devices, other UAVs, etc.

The processor 460 and/or the navigation unit 463 may be configured to communicate with a server through a wireless connection (e.g., a cellular data network) to receive data useful in navigation, provide real-time position reports, and assess data. An avionics module 467 coupled to the processor 460 and/or the navigation unit 463 may be configured to provide travel control-related information such as altitude, attitude, airspeed, heading and similar information that the navigation unit 463 may use for navigation purposes, such as dead reckoning between GNSS position updates. The avionics module 467 may include or receive data from a gyro/accelerometer unit 465 that provides data regarding the orientation and accelerations of the UAV 400 that may be used in navigation and positioning calculations.

The processor 460 may use the radio module 490 to conduct wireless communications with a variety of wireless communication devices, such as a beacon, server, smartphone, tablet, or other computing device with which the UAV 400 may be in communication. Wireless communications (e.g., using a bi-directional wireless link 422) may be established between a UAV antenna 491 of the radio module 490 and platform antenna 115 of the charging station 110. The radio module 490 may be configured to support multiple connections with different wireless communication devices. The UAV 400 may communicate with a server through one or more intermediate communication links, such as one or more network nodes or other communication devices.

In various embodiments, the radio module 490 may be configured to switch between a cellular connection and a Wi-Fi® or other form of radio connection depending on the location and altitude of the UAV 400. For example, while in flight at an altitude designated for UAV traffic, the radio module 490 may communicate with a cellular infrastructure in order to maintain communications with a server. An example of a flight altitude for the UAV 400 may be at around 400 feet or less, such as may be designated by a government authority (e.g., FAA) for UAV flight traffic. At this altitude, it may be difficult to establish communication with some of the wireless communication devices using short-range radio communication links (e.g., Wi-Fi®). Therefore, communications with other wireless communication devices may be established using cellular telephone networks while the UAV 400 is at flight altitude. Communication between the radio module 490 and the charging station 110 may transition to a short-range communication link (e.g., Wi-Fi® or Bluetooth®) when the UAV 400 moves closer to the charging station 110. Similarly, the UAV 400 may include and employ other forms of radio communication, such as mesh connections with other UAVs or connections to other information sources (e.g., balloons or other stations for collecting and/or distributing weather or other data harvesting information).

In various embodiments, the control unit 450 may be equipped with the input module 480, which may be used for a variety of applications. For example, the input module 480 may receive images or data from an onboard camera or sensor, or may receive electronic signals from other components (e.g., a payload). The input module 480 may receive an activation signal for causing actuators on the UAV to deploy clamps (e.g., grappling component) or similar components for securing itself. In addition, the output module 485 may be used to activate components (e.g., an energy cell, an actuator, an indicator, a circuit element, a sensor, a grappling component, adjustment of landing columns, and/or an energy-harvesting element).

While the various components of the control unit 450 are illustrated as separate components, some or all of the components (e.g., the processor 460, the output module 485, the radio module 490, and other units) may be integrated together in a single device or module, such as a system-on-chip module.

When selecting from multiple available charging stations and/or docking terminals, the processor 460 of the UAV 400 may select a preferred charging station and/or docking terminal based on various factors, such as (but not limited to) which one best meets the current mission power parameters of the UAV 400 based on its location. The UAV 400 may take many considerations into account, such as (but not limited to) a speed at which the docking terminal charges, how long the docking terminal may be available, safety, cost, and/or the like, before selecting a particular charging station and/or a particular docking terminal at a charging station. The UAV 400 may communicate the preference for a particular charging station and/or docking terminal when transmitting a docking request to a particular charging station (e.g., in block 210 in FIG. 2 in which the charging station receives a docking request).

The UAV 400 may access charging station data from an onboard source (e.g., memory 461, sensors 482, or input module 480) or a remote source (e.g., server 500 or other source on from the Internet 550). In addition, charging station data may originate or come directly from other UAVs 401, 402. For example, the server 500 may provide general information about the coordinates of the charging station 110 or other information such as time-of-day, and weather related information. Further, while charging batteries at the charging station 110, the UAV 400 may receive a charging station data updates (i.e., changes of availability of one or more other charging stations) or other information such as notice of an approaching storm or other events.

Some charging station sites may have time-of-day restrictions, require certain authorizations, or have other access limitations. Risks at a site may reflect a likelihood that people or creatures might interfere or tamper with the UAV 400. For example, the charging station data may reflect a preference for the rooftops of commercial buildings, which tend to be safer than high-traffic areas. Risks assessments may also reflect how stable or reliable the positions at a site may be for a UAV 400. For example, loose surfaces or fixtures that yield or collapse under the weight of a UAV may increase the risk of a site.

In some embodiments, the information stored in the memory of the UAV 400 may have a limited useful life, which may be indicated when the information is obtained (e.g., by an expiration time). The UAV 400 may track the expiration of the information stored in the memory using a timer or the like. For example, if the database information has expired or is otherwise beyond the indicated useful life, the UAV processor may contact the server to reload the latest database information. In some embodiments, a UAV storing expired database information may not be allowed to deviate from a current course, except in an emergency.

In some embodiments, the database information stored and/or maintained on a given server (e.g., 500) may be populated by other servers (or entities) or by access to other servers (or entities). For instance, a server may be configured to query or otherwise obtain event information from an entity/server associated with a restricted area in which an event may be taking place or may be scheduled to take place in the restricted area.

Various forms of computing devices may be used to communicate with a processor of a UAV, including personal computers, mobile computing devices (e.g., smartphones, etc.), servers, laptop computers, etc., to implement the various embodiments including the embodiments described with reference to FIGS. 1-5. Such computing devices may typically include, at least, the components illustrated in FIG. 5, which illustrates an example server computing device, server 500. With reference to FIGS. 1-5, the server 500 may typically include a processor 501 coupled to volatile memory 502 and a large capacity nonvolatile memory, such as a disk drive 503. The server 500 may also include a floppy disc drive, compact disc (CD) or digital video disc (DVD) drive 506 coupled to the processor 501. The server 500 may also include network access ports 504 (or interfaces) coupled to the processor 501 for establishing data connections with a network, such as the Internet and/or a local area network 505 coupled to other system computers and servers. Similarly, the server 500 may include additional access ports, such as USB, Firewire, Thunderbolt, and the like for coupling to peripherals, external memory, or other devices.

The foregoing method descriptions and the process flow diagrams are provided merely as illustrative examples and are not intended to require or imply that the operations of the various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the spirit or scope of the claims. Thus, the present disclosure is not intended to be limited to the embodiments shown herein but is to be accorded the widest scope consistent with the following claims and the principles and novel features disclosed herein.

What is claimed is:

1. A method for managing an unmanned aerial vehicle (UAV) charging station, comprising:
   receiving, in a processor, docking requests from UAVs;
   determining, by the processor, a priority of a first UAV and a priority of a second UAV for using a docking terminal of the UAV charging station based on an available power level of each of the first and second UAVs; and
   instructing the first UAV to undock from the docking terminal in response to determining that the priority of the second UAV is greater than the priority of the first UAV.

2. The method of claim 1, further comprising:
   establishing a communication link between the UAV charging station and the second UAV; and
   receiving, in the processor, the available power level and a UAV ranking from the second UAV,
   wherein determining the priority of the first UAV and the priority of the second UAV for using the docking terminal comprises determining priorities of the first and second UAVs for using the docking terminal by weighing the available power level and the UAV ranking of each of the first and second UAVs.

3. The method of claim 2, wherein the available power level is weighted more heavily than the UAV ranking when determining the priorities of the first and second UAVs for using the docking terminal in response to the available power level of either the first or second UAVs being below a threshold.

4. The method of claim 2, wherein the UAV ranking is given no weighting when determining the priorities of the first and second UAVs for using the docking terminal in response to the available power level of either the first or second UAVs being below a threshold.

5. The method of claim 2, wherein the available power level is given no weighting when determining the priorities of the first and second UAVs for using the docking terminal in response to the UAV ranking of either the first or second UAVs being above a predetermined ranking.

6. The method of claim 1, further comprising:
   establishing a communication link between the UAV charging station and the second UAV; and
   receiving, in the processor, the available power level from the second UAV,
   wherein determining the priority of the first UAV and the priority of the second UAV for using the docking terminal comprises determining priorities of the first and second UAVs for using the docking terminal based on the available power level of each of the first and second UAVs.

7. The method of claim 1, wherein one or more of the received docking requests from UAVs include information selected from a group consisting of UAV identification, UAV authentication information, UAV ranking, the available power level, and how long the second UAV has been waiting to dock at the UAV charging station.

8. The method of claim 1, wherein instructing the first UAV to undock from the docking terminal includes information about another charging station to which the first UAV may dock.

9. The method of claim 1, wherein instructing the first UAV to undock from the docking terminal comprises authorizing the first UAV to move to a different location.

10. The method of claim 1, wherein instructing the first UAV to undock from the docking terminal comprises instructing the first UAV to change to a different docking terminal at the UAV charging station.

11. The method of claim 1, wherein instructing the first UAV to undock from the docking terminal comprises instructing the first UAV to remain at the UAV charging station for a battery swap.

12. The method of claim 1, wherein determining the priority of the second UAV is in response to the received docking requests from the UAVs including a docking request from the second UAV while the first UAV occupies the UAV charging station.

13. An unmanned aerial vehicle (UAV) charging station comprising:
   a docking terminal including a charger configured to charge UAVs;
   a transceiver configured to communicate with one or more UAVs; and
   a processor coupled to the charger and the transceiver, wherein the processor is configured with processor-executable instructions to:
      receive docking requests from UAVs;
      determine a priority of a first UAV and a second UAV for using the docking terminal based on an available power level of each of the first and second UAVs; and
      instruct the first UAV to undock from the docking terminal in response to determining that the second UAV has a higher priority.

14. The UAV charging station of claim 13, wherein the processor is further configured with the processor-executable instructions to:
   establish a communication link between the UAV charging station and the second UAV; and
   receive, via the transceiver, the available power level and a UAV ranking from the second UAV;
   wherein the processor is further configured to determine the priority of the first UAV and of the second UAV for using the docking terminal by weighing the available power level and the UAV ranking of each of the first and second UAVs.

15. The UAV charging station of claim 14, wherein the processor is further configured with the processor-executable instructions to determine the priority of the first UAV and of the second UAV for using the docking terminal by weighing the available power level more heavily than the UAV ranking in response to the available power level of either the first or second UAVs being below a predetermined low threshold.

16. The UAV charging station of claim 14, wherein the processor is further configured with the processor-executable instructions to determine the priority of the first UAV and of the second UAV for using the docking terminal by giving the UAV ranking no weighting in response to the available power level of either the first or second UAVs being below a predetermined critical threshold.

17. The UAV charging station of claim 14, wherein the processor is further configured with the processor-executable instructions to determine the priority of the first UAV and of the second UAV for using the docking terminal by giving the available power level no weighting in response to the UAV ranking of either the first or second UAVs being above a predetermined ranking.

18. The UAV charging station of claim 13, wherein one or more of the docking requests includes information selected from a group consisting of UAV identification, UAV authentication information, UAV ranking, the available power level, and how long the second UAV has been waiting to dock at the UAV charging station.

19. The UAV charging station of claim 13, wherein the processor is further configured with the processor-executable instructions to include information about another charging station when instructing the first UAV to undock from the docking terminal.

20. The UAV charging station of claim 13, wherein the processor is further configured with the processor-executable instructions to authorize the first UAV to remain at the UAV charging station but not in the docking terminal when instructing the first UAV to undock from the docking terminal.

21. The UAV charging station of claim 13, wherein the processor is further configured with the processor-executable instructions to instruct the first UAV to change to a different docking terminal at the UAV charging station when instructing the first UAV to undock from the docking terminal.

22. The UAV charging station of claim 13, wherein the processor is further configured with the processor-executable instructions to instruct the first UAV to remain at the UAV charging station for a battery swap when instructing the first UAV to undock from the docking terminal.

* * * * *